UNITED STATES PATENT OFFICE.

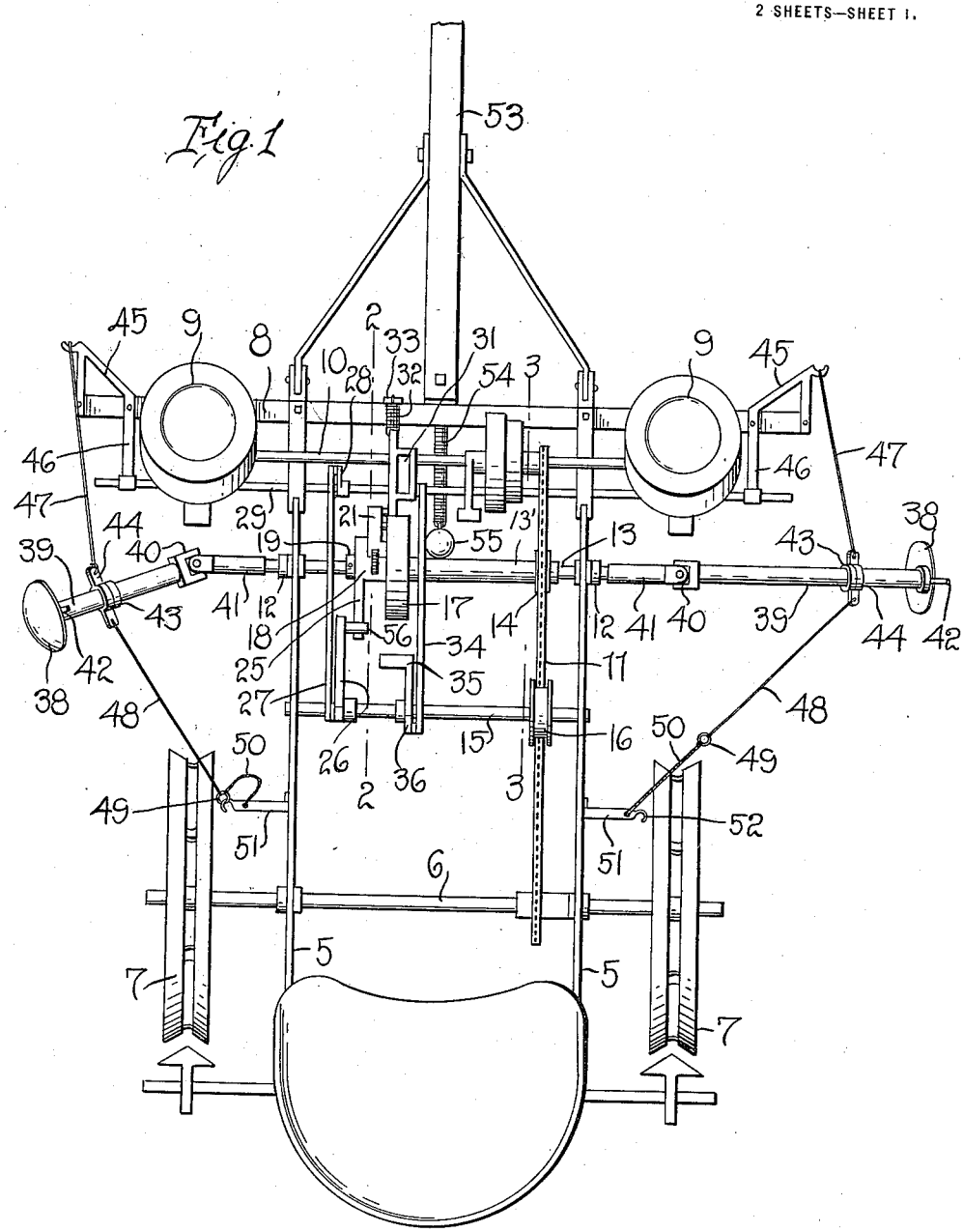

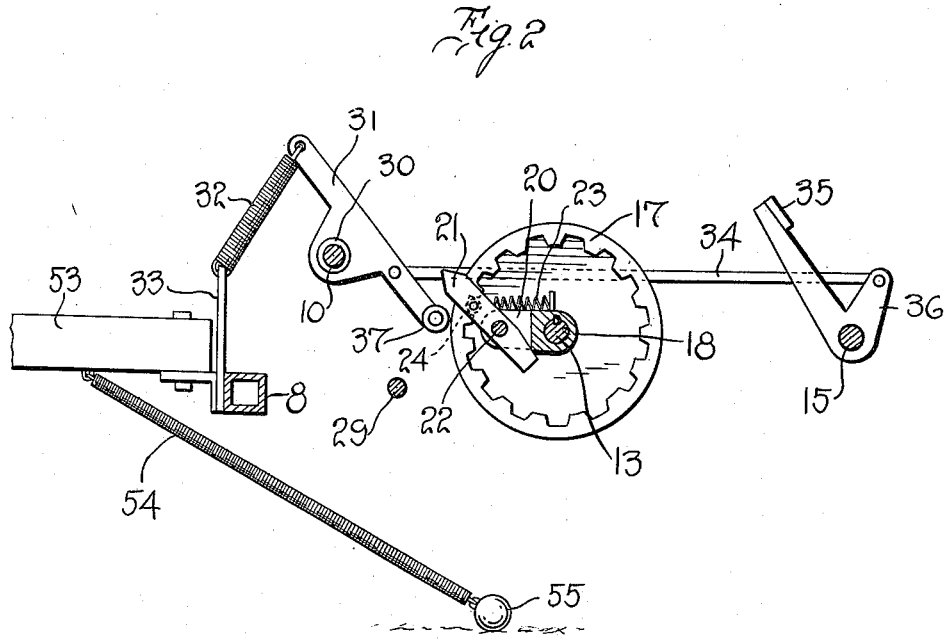
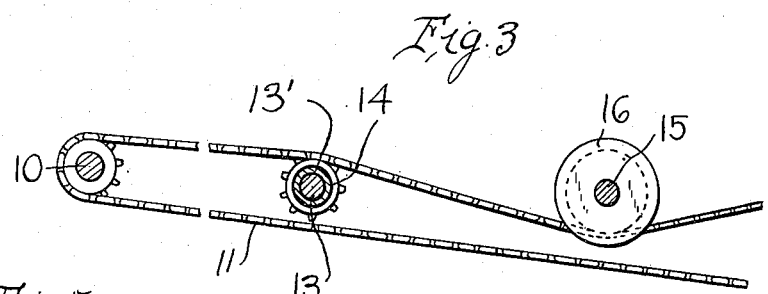
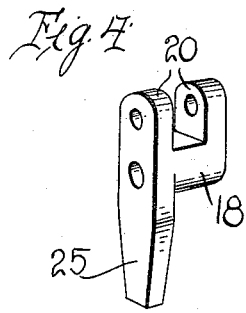
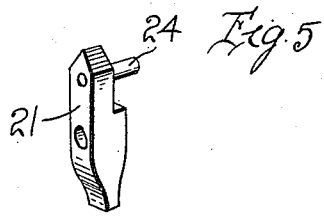

ARTHUR L. RARDON, OF BROWNING, MISSOURI.

CORN-PLANTER.

1,158,847.  Specification of Letters Patent.  Patented Nov. 2, 1915.

Application filed February 27, 1915. Serial No. 10,983.

*To all whom it may concern:*

Be it known that I, ARTHUR L. RARDON, a citizen of the United States, residing at Browning, in the county of Linn and State of Missouri, have invented certain new and useful Improvements in Corn-Planting Machines, of which the following is a specification, reference being had to the accompanying drawings.

This invention relates to an improved corn planting machine, and has for its primary object to provide improved means for intermittently dropping the seed into the depositing boots, and means under the control of the operator for rendering the seed dropping mechanism inoperative.

The invention has for an additional object to provide an improved form of trip device for intermittently actuating the seed dropping mechanism, including a tripping member loosely mounted upon a driven shaft, a gear fixed on said shaft, a spring held clutch block carried by the trip member and provided with means engaging the teeth of the gear to lock the trip member thereto, and manually operable means for actuating the clutch block to move the same out of coöperative relation to the gear and release the trip member.

The invention has for a further object to provide markers extending from opposite sides of the machine and flexibly connected to a positively driven shaft to be rotated thereby during the movement of the machine, and means for independently elevating the markers to inoperative position.

With the above and other objects in view, my invention consists in the novel features of construction, combination, and arrangement of parts to be hereinafter more fully described, claimed, and illustrated in the accompanying drawings, in which, Figure 1 is a plan view of a corn planting machine constructed in accordance with the preferred embodiment of my invention; Fig. 2 is a section taken on the line 2—2 of Fig. 1; Fig. 3 is a section taken on the line 3—3 of Fig. 1; Fig. 4 is a detail perspective view of the clutch block; and Fig. 5 is a similar view of the trip member.

Referring in detail to the drawings, 5 designates the frame of the machine which is mounted upon the axle 6, upon the opposite ends of which the ground wheels 7 are suitably secured. Upon the forward end of the machine frame, a transverse frame 8 is secured, and on the opposite ends of said transverse frame, the hoppers 9 are arranged. Any suitable planting mechanism is arranged in the base of each hopper, and these mechanisms are actuated by a common shaft 10 driven by the chain 11 which traverses a sprocket wheel on said shaft and a sprocket on the wheel axle 6.

To the longitudinal side bars of the frame 5, hanger bearings 12 are clamped or otherwise secured, and in said bearings a transversely disposed shaft 13 is journaled. Upon this shaft, a sleeve 13′ is loosely engaged, said sleeve having a sprocket wheel 14 fixed on one end and a gear wheel 17 secured upon its opposite end. Rearwardly of the shaft 13, a transversely disposed cylindrical rod 15 connects the longitudinal side bars of the frame 5 and upon this rod, a peripherally grooved wheel or sheave 16 is rotatably mounted. The upper stretch of the chain 11 extends under this wheel and is guided thereby.

Upon the shaft 13, the trip block 18 is keyed, longitudinal shifting movement of said block being prevented by suitable collars 19. The block 18 includes a body portion which is bored to receive the shaft 13 and the spaced laterally projecting lugs 20 between which the clutch member 21 is disposed, said clutch member being pivoted upon the lugs 20 by the pin 22. At one side of the pivot pin 22, a coil spring 23 connects the clutch member to the body of the block 18, and yieldingly holds said clutch member against pivotal movement in one direction. In the clutch member 21 a stud is fixed, and upon said stud, a roller indicated at 24, is loosely mounted. This roller is normally adapted to engage between the teeth of the internal gear 17, thereby locking the clutch member and the block to the gear for rotation with the shaft 13. The block 18 is also formed with a tripping arm 25 which is adapted to engage one arm of a bell crank lever 26 loosely mounted upon the transverse rod 15. The other arm of this lever is connected by means of a rod 27, to an arm 28 fixed upon a shaft 29 mounted in the frame of the machine. This shaft actuates suitable releasing valves in the bottom of the hoppers 9 to release a predetermined quantity of seed therefrom.

A collar or sleeve 30 is fixed upon the shaft 10, and upon said collar, the member 31 is loosely mounted. A coil spring 32 connects one end of this member to a bracket 33 which is clamped to the transverse frame 8, said spring normally holding the other or rear end of the member 31 in an elevated position. To said member, at a point intermediate of its ends, one end of a rod 34 is connected, the other end of said rod being loosely attached to the arm 36 of a foot lever 35 which is mounted upon the transverse rod 15. Upon the rear end of the member 31, a roller 37 is suitably mounted.

38 designates the marking disks, each of which is fixed to the outer end of the rod or arm 39, the inner end of which is flexibly connected, as at 40, to a sleeve 41 which is secured upon one end of the shaft 13. To the periphery of each of the marking disks 38, a cross bar 42 is secured. A collar 43 is fixed upon each of the marker arms 39 and a loose collar 44 engaged upon the arm, is held against inward shifting movement by said fixed collar. To each end of the frame 8, a bracket member 45 is secured each of said members having a rearwardly projecting arm 46 in which one end of the transverse shaft 29 is mounted. Rods 47 connect each of the bracket members to the collars 44 of the respective marker arms 39 and each of said collars is also connected by means of a rope or cable 48, to a ring 49 which is suitably secured upon one end of a rope 50, the other end of which is attached to a standard or upright 51 secured to one of the longitudinal side bars of the frame. The upper end of this standard is formed into a hook 52 with which the ring 49 is adapted to be engaged.

To the under side of the vehicle tongue, indicated at 53, one end of a long closely coiled spring 54 is attached, the other end of said spring being provided with a heavy ball 55 which is adapted to trail upon the ground.

The sprocket wheel 14 is of such size and is provided with the requisite number of teeth, to cause one complete rotation of the shaft 13 in each 3′, 6″ of travel of the machine. The marking disks 38 are, of course, also rotated and positively produce the guide lines in the surface of the ground, the cross bars 42 carried by the disks indicating the spaces between the seed holes. The rear end of the trip arm 25 strikes a roller 56 on the forwardly projecting arm of the bell crank lever 26 and thus oscillates said lever to rock the shaft 29 through the medium of the connecting rod 27. Thus, in each revolution of the shaft 13, and simultaneously with the engagement of the marking bars 42 with the ground, a predetermined quantity of seed is released from the hoppers and deposited into the planting boots. It is, of course, understood that in a movement of the machine in each direction across the field, only one of the marking disks 38 is engaged with the ground, the other one being elevated and the ring 49 engaged with the hook 52 on the upper end of the upright 51. When the operator desires to turn the machine at the end of the field, he presses upon the foot lever 35 and throws the pivotally mounted member 31 so that the roller 37 thereon will engage the forward end of the clutch member 21 and rock the same upon the trip block 18 against the action of the spring 27. The roller 24 on the clutch member is thus moved out of engagement with the teeth of the internal gear 17, whereby the sleeve 13′ will be rotated upon the shaft 13, said shaft remaining stationary, and the planting of the seed will thus be stopped. After the machine has been turned, the same is positioned so that the weight 55 on the end of the spring 54 will travel in one of the longitudinal guide lines previously formed by the marker 38. When this ball reaches one of the cross marks on the guide line formed by the bar 42, the operator releases pressure upon the foot pedal so that the clutch member 21 returns to its normal position and the trip is again locked in connection with the gear 17. The intermittent planting of the seed proceeds as before. In this manner, it will be apparent that the seeds are deposited in straight rows in each direction across the field.

From the foregoing description, taken in connection with the accompanying drawings, the construction, manner of operation, and several advantages of my improved corn planter will be clearly and fully understood.

The mechanism employed is quite simple, and positive and reliable in its operation. The machine, as a whole, may be produced at small manufacturing cost, and greatly facilitates the proper planting of the seed.

While I have illustrated in the drawing a particular form of the machine frame, it will be understood that the planting mechanism may be readily adapted to machines of various other types now in common use. The several parts of the mechanism are also susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

The combination with a corn planter having a shaft controlling the planting of the seed, of a shaft mounted in the machine frame, a trip fixed upon said shaft and having an arm projecting upon one side of the axis of the shaft, a gear loose upon said shaft, means for positively rotating said gear, a spring held clutch member pivotally mounted upon the trip projecting upon the opposite side of the axis of said shaft with respect to said arm, said clutch member being normally engaged with the gear to lock said gear to the shaft, means for operating said first named shaft engaged and actuated by the arm of the trip in the rotation of the latter shaft, and manually operable means co-acting directly with said clutch member to release the same from locking engagement with said gear.

In testimony whereof I hereunto affix my signature in the presence of two witnesses.

ARTHUR L. RARDON.

Witnesses:
 NOAH E. COTTER,
 LEO E. JONES.

Copies of this patent may be obtained for five cents each, by addressing the "Commissioner of Patents, Washington, D. C."